Figure 1:
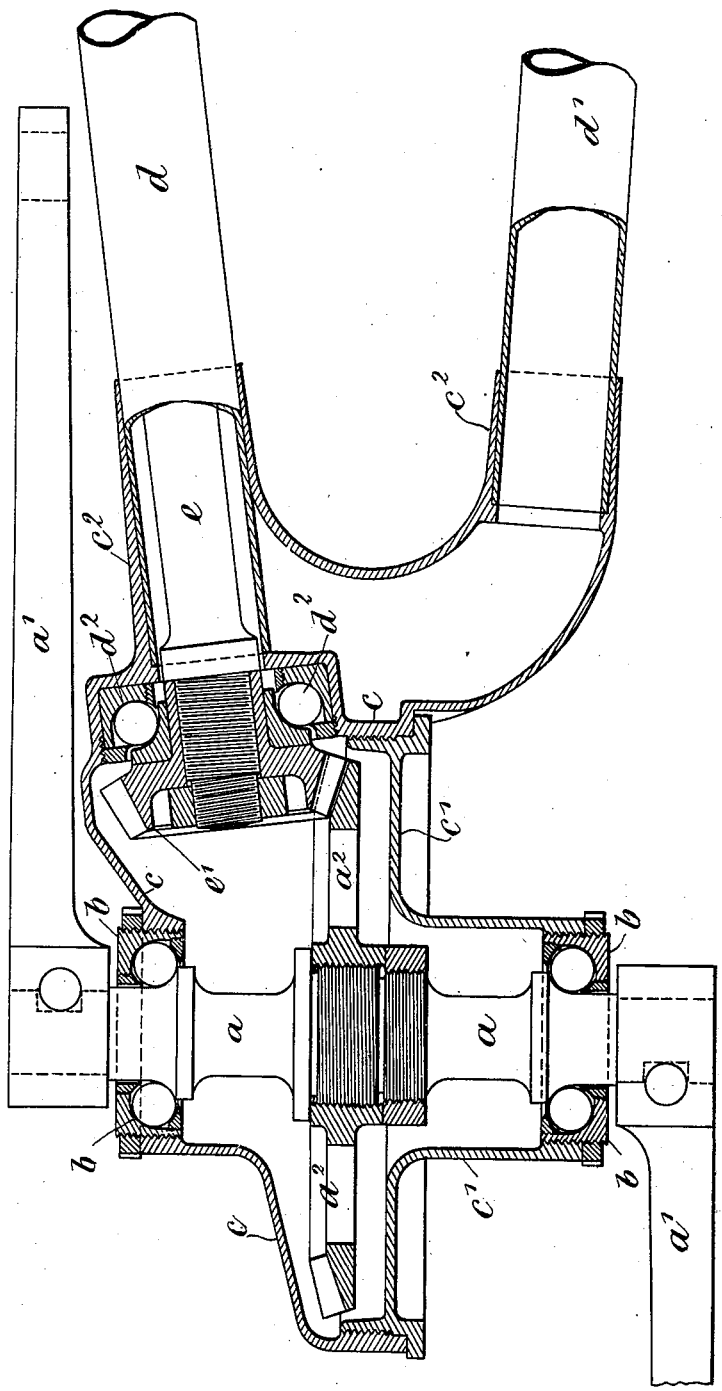

No. 628,135. Patented July 4, 1899.
T. H. WILLIAMS.
GEAR FOR CYCLES.
(Application filed Dec. 10, 1898.)
(No Model.) 3 Sheets—Sheet 1.

Witnesses.
Inventor.

No. 628,135. Patented July 4, 1899.
T. H. WILLIAMS.
GEAR FOR CYCLES.
(Application filed Dec. 10, 1898.)
(No Model.) 3 Sheets—Sheet 2.
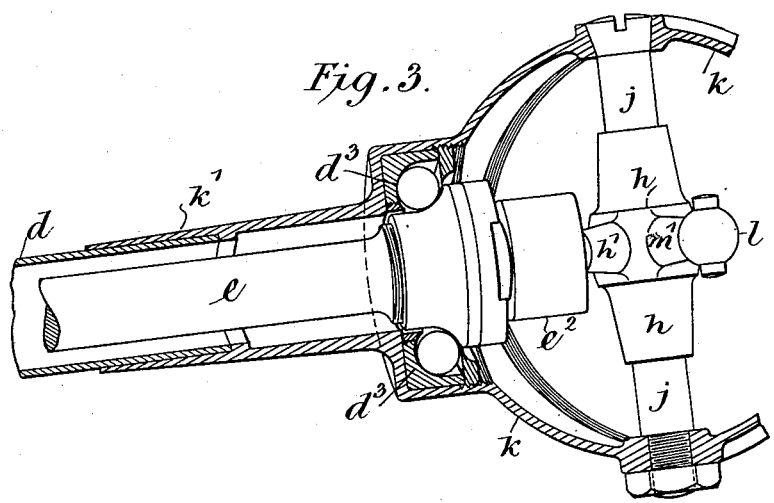
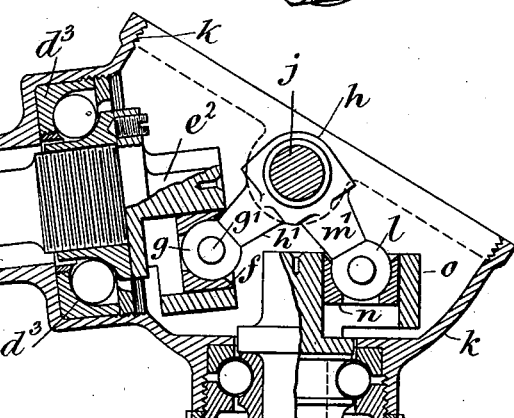
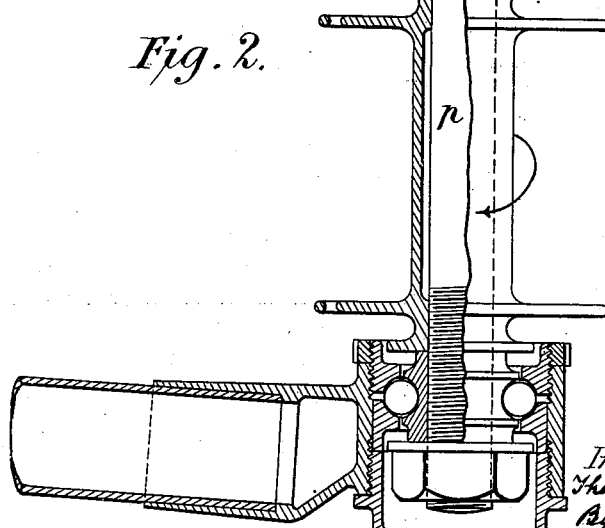
Witnesses.
Inventor.

No. 628,135. Patented July 4, 1899.
T. H. WILLIAMS.
GEAR FOR CYCLES.
(Application filed Dec. 10, 1898.)
(No Model.) 3 Sheets—Sheet 3.
Fig. 4.
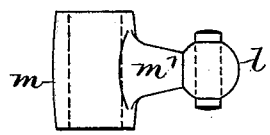
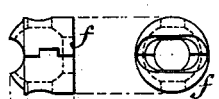
Fig. 8.
Fig. 5.
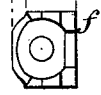
Fig. 6.
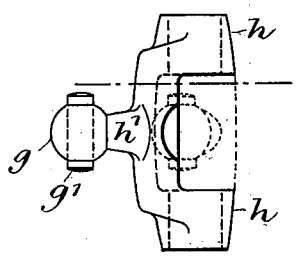
Fig. 7.
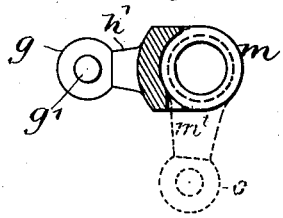
Witnesses.
Ed Bulloch
Walter R. Dubbs.
Inventor
Thomas Henry Williams
By his Attorneys,
Baldwin Davidson Wight

UNITED STATES PATENT OFFICE.

THOMAS HENRY WILLIAMS, OF LONDON, ENGLAND.

GEAR FOR CYCLES.

SPECIFICATION forming part of Letters Patent No. 628,135, dated July 4, 1899.

Application filed December 10, 1898. Serial No. 698,874. (No model.)

*To all whom it may concern:*

Be it known that I, THOMAS HENRY WIL-LIAMS, civil engineer, a subject of the Queen of Great Britain, residing at 64 Grant road, Battersea, in the city of London, England, have invented certain new and useful Gears for Cycles, of which the following is a specification.

It is well known that chain-gear on cycles has many disadvantages, and endeavors have been made to remove these by driving through a longitudinal lay-shaft having bevel-pinions at its ends gearing with corresponding pinions on the crank-shaft and on the axle of the road-wheel. This arrangement, however, has disadvantages of its own, for any flexure of the frame of the machine (which cannot be avoided without increasing the weight to a prohibitive extent) brings the latter pinions closer together, making them nip the pinions on the lay-shaft, thus causing binding of the gearing and a great increase of friction. I overcome these difficulties by replacing the bevel-gear at one end of the lay-shaft by a universal joint of special construction whose efficiency is not affected by small changes in the distance apart and parallelism of the other two shafts and by so arranging the bearings of the lay-shaft that any flexure of the frame tends to loosen and not to tighten them.

The drawings show so much of a bicycle as is necessary to illustrate my invention.

Figure 1 is a section, approximately horizontal, through the center lines of the crank and lay shafts; and Fig. 2 is a continuation of the same section, showing the other end of the lay-shaft and the axle of the road-wheel. Fig. 3 is a vertical section on the center line of the lay-shaft, Fig. 2. Figs. 4 to 8 show details of the universal joint.

$a$ is the crank-shaft, and $a'$ the cranks fixed to it. The crank-shaft runs in ball-bearings $b$, carried by a casing made in two parts $c\ c'$, screwing together. The part $c$ of the casing has in it sockets $c^2$ to receive the ends of the tubes $d\ d'$, forming the under frame of the machine.

$a^2$ is a bevel-wheel inside the casing and fixed to the crank-shaft between its bearings, an arrangement which gives great steadiness and equalizes the strain on the bearings.

$e$ is the lay-shaft, running in ball-bearings $d^2\ d^3$ at the ends of the tube $d$, and $e'$ is a bevel-pinion fixed at its end and gearing with the wheel $a^2$ on the crank-shaft. $e^2$ is a crank fixed at the other end of the lay-shaft and having in it a cylindrical hole parallel to the shaft, in which a cylindrical block $f$ is free to slide to and fro. The block $f$ is made in two parts, tenoned together, as shown in Fig. 8, and has in it a spherical hollow to receive a ball $g$, and has also a hole passing diametrically through it to form bearings for trunnions $g'$, fixed to the ball. The ball $g$ is fixed to the end of an arm $h'$, projecting from a sleeve $h$, free to move to and fro and also to turn on a pin $j$, fixed in a casing $k$, which carries a socket $k'$, in which the tube $d$ is fixed.

$l$ is a ball fixed on an arm $m'$.

In Figs. 3 and 4 the arms $h'$ and $m'$ and the sleeve $h$ are for the sake of simplicity all shown in one piece, a construction which may be used; but in order to give greater flexibility it is preferred to make them in two pieces, as shown in Figs. 4 to 7, where the sleeve $h$, to which the arm $h'$ is fixed, is notched at its middle to receive a second sleeve $m$, carrying the arm $m'$. The ball $l$ works in a block $n$ similar to the block $f$ and working in a crank $o$ equal and similar to the crank $e^2$ and fixed to the axle $p$ of the road-wheel. As the crank $e^2$ revolves the arm $h'$ causes the sleeve $h$ (or sleeves $h$ and $m$) to rock and also to move to and fro on the pin $j$, and these motions cause the arm $m'$ to drive the crank $o$ in unison with the crank $e^2$.

It will be observed that with this construction any slight flexure of the tube $d$ and consequent drawing together of the bearings $d^2\ d^3$ will not prejudicially affect the working of the machine. The only results will be to slightly loosen the bearing $d^3$ and cause the block $f$ to enter a little more deeply into the hole in the crank $e^2$. Owing also to the wheel $a^2$ being at the center of the crank-shaft and between its bearings any slight flexure of the framing does not perceptibly affect its gearing properly with the pinion $e'$.

The universal joint may be placed at the other end of the lay-shaft, but not as a rule advantageously.

I claim—

1. The combination of a crank shaft or axle, a road-wheel axle parallel to the crank-axle, bearings for the two axles, a frame connecting the bearings, a lay-shaft and its bearings, gearing at one end of the lay-shaft connecting it to one of said axles, a crank on the opposite end of the lay-shaft, a corresponding crank on the other axle, blocks fitting and working in sockets in said cranks parallel with the axes of the cranks, a pin fixed to the frame, a sleeve free to move to and fro and turn on the pin, arms fixed to the sleeve and balls at the ends of the arms working in sockets in the blocks, substantially as set forth.

2. The combination of a crank shaft or axle, a road-wheel axle parallel to the crank-axle, bearings for the two axles, a frame connecting the bearings, a lay-shaft and its bearings, beveled gearing at one end of the lay-shaft connecting it to one of said axles, a crank at its opposite end, a corresponding crank on the other axle, cylindrical blocks fitting and working in sockets in the cranks parallel with the axes of the cranks, a pin fixed to the frame, a sleeve free to move to and fro and turn on the pin, arms fixed to the sleeve and trunnions on said arms mounted in bearings in said blocks, substantially as set forth.

3. The combination of a crank-shaft, a road-wheel axle parallel to the crank-shaft, bearings for the shaft and axle, a frame connecting these bearings, a lay-shaft and its bearings, gearing at one end of the lay-shaft connecting it to the crank-shaft, a crank at its opposite end, a corresponding crank on the axle, blocks working in correspondingly-shaped sockets in the cranks parallel with the axes of the crank, a pin fixed to the frame, a sleeve consisting of two parts pivoted together and free to move to and fro and turn on the pin, and arms fixed respectively to the two parts of the sleeve and having their ends working in sockets in the said blocks.

4. The combination of a shaft $e$ and its bearings, the shaft or axle $p$ and its bearings, the two shafts being arranged at an angle to each other, the crank fixed on the end of the shaft $e$, the corresponding crank fixed on the end of the shaft $p$, each crank having a recess therein parallel with its axis, blocks with spherical sockets working in said recesses, a fixed pin, a sleeve free to move to and fro and turn on said pin, arms fixed to the sleeve, and balls at the ends of the arms working in the sockets in the blocks, substantially as set forth.

5. The combination of the shaft $e$ and its bearings, the shaft $p$ and its bearings, the two shafts being arranged at an angle to each other, the crank fixed on the end of the shaft $e$, the corresponding crank fixed on the end of the shaft $p$, each crank having a recess therein parallel with its axis, cylindrical blocks with sockets therein working in said recesses, a fixed pin, a sleeve free to move to and fro and turn on said pin, arms fixed to the sleeve with their ends in said sockets and trunnions at the ends of the arms having bearings in said blocks, substantially as set forth.

THOMAS HENRY WILLIAMS.

Witnesses:
WILFRED CARPMAEL,
W. M. HARRIS.